C. LEDERER, Sr.
LAWN MOWER ATTACHMENT.
APPLICATION FILED OCT. 20, 1917.
1,270,177.
Patented June 18, 1918.
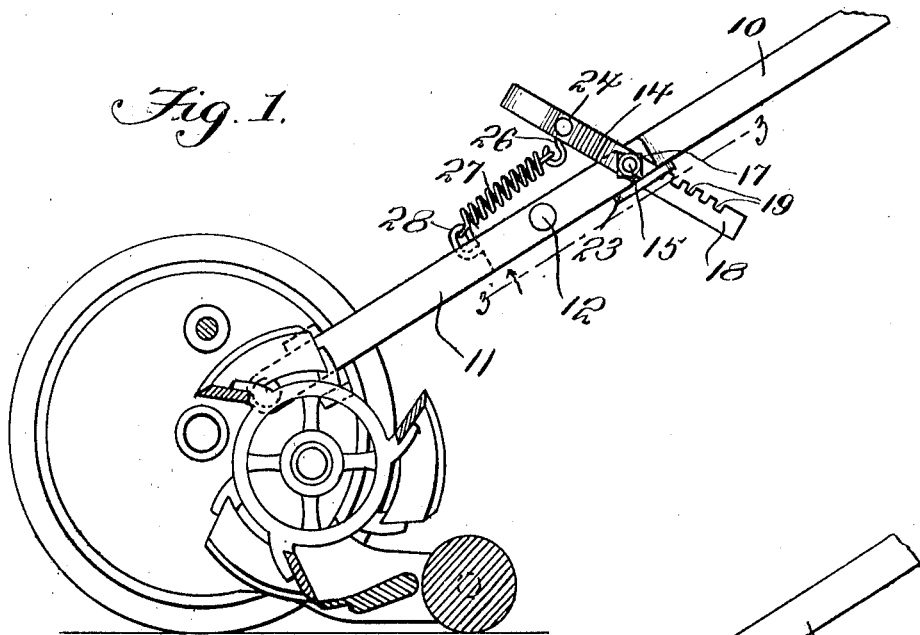
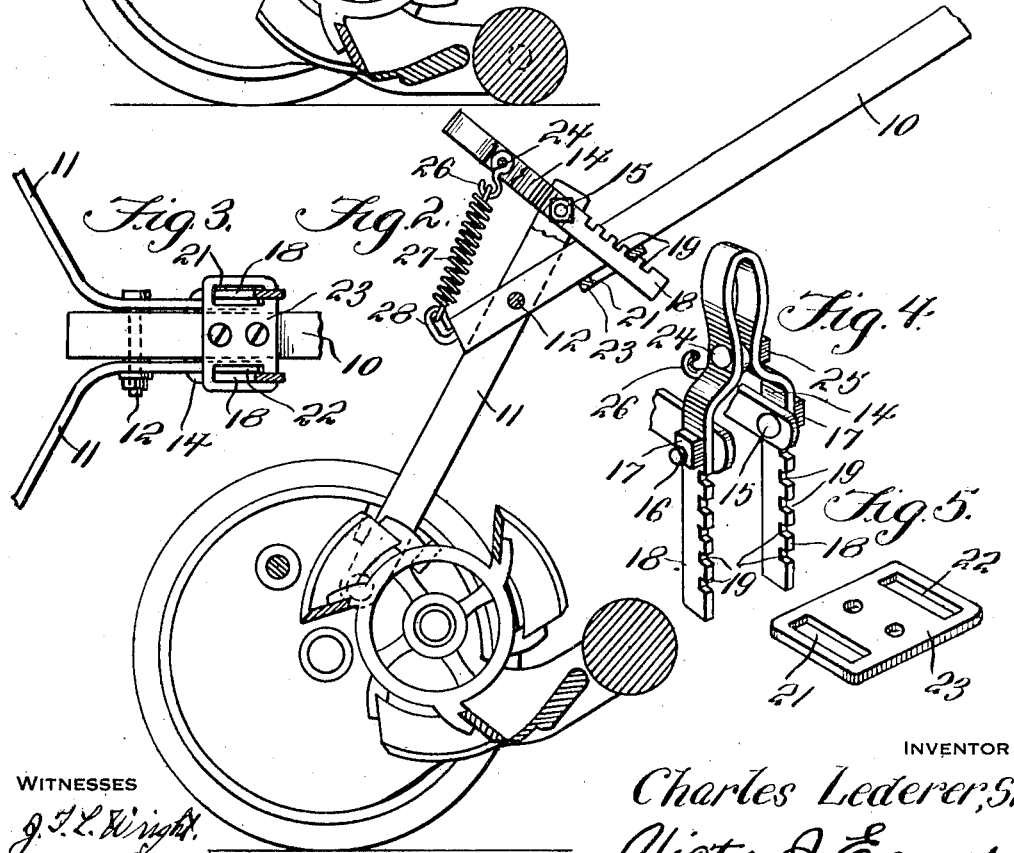
WITNESSES
INVENTOR
Charles Lederer, Sr.
BY Victor J. Evans
ATTORNEY

UNITED STATES PATENT OFFICE.

CHARLES LEDERER, SR., OF PIERCE, NEBRASKA.

LAWN-MOWER ATTACHMENT.

1,270,177.  Specification of Letters Patent.  Patented June 18, 1918.

Application filed October 20, 1917. Serial No. 197,662.

*To all whom it may concern:*

Be it known that I, CHARLES LEDERER, Sr., a citizen of the United States of America, residing at Pierce, in the county of Pierce and State of Nebraska, have invented new and useful Improvements in Lawn-Mower Attachments, of which the following is a specification.

This invention relates to attachments for lawn mowers and the principal object is to provide means of novel construction for adjusting the relative position of the bail and the handle, said bail connecting the handle with the mower proper.

A further object is to provide in connection with a handle having pivotal connection with a bail, and an engaging device carried by the handle, a toothed member having pivotal connection with the bail at the extreme end thereof and acting under the control of a spring connecting said toothed member with the end of the handle portion.

With the foregoing and other objects in view, the invention consists in the novel construction, combination and arrangement of elements hereinafter described and claimed.

In the accompanying drawings:

Figure 1 is a view in side elevation, portions of the mower proper being shown in section.

Fig. 2 is a further view in elevation showing the adjustable elements in another position.

Fig. 3 is a detail in bottom plan.

Fig. 4 is a perspective view of a notched member holding the handle in an adjusted position with reference to the bail.

Fig. 5 is a perspective view of a plate engaged by the device shown in Fig. 4.

The handle is designated 10 and has pivotal connection with the bail 11 at the point 12. The relative position of the handle with reference to the bail is determined by the position of a forked and toothed member designated as a whole by the number 14, and having pivotal connection at 15 with the extreme upper end of the bail. This pivotal connection provides sufficient play to afford ready adjustment, and the threaded ends 16 of each of the pivots are secured by means of nuts, the elements last named being designated 17.

The forked and toothed member 14 comprises a plurality of legs 18 provided with notches 19 for engaging the edges of slots 21 and 22 formed in plate 23 mounted on the lower side of the handle by means of screws passing through apertures shown in Fig. 5 between slots 21, 22.

A bolt or screw 24 passes through the upper portion of forked member 14 and is retained in position by a nut 25, this bolt having connection with a hook 26, which in turn is connected with a coil spring 27, the opposite end of which is attached to any suitable securing device 28 mounted in the lower end of handle 10. The coil spring serves to retain the forked member in such a position that the notched portion engages the edges of the slots of the plate 23, after suitable adjustment has been secured. In order to change the adjustment it is only necessary to move the upper portion of the forked member in a direction to place tension on the coil spring 27 and swing said member on its pivot or pivots 15, thereby freeing the notched portion from engagement with the edges of plate 23.

What is claimed is:

1. In a device of the class described, a bail portion adapted for connection with a lawn mower or the like, a handle having pivotal connection with the bail at a point spaced from the end thereof, a toothed member having pivotal connection with the end of the bail, means carried by the handle for engaging the toothed member, and resilient means connected with the toothed member and with the end of the handle for holding the toothed member in engagement with the engaging means.

2. In a device of the class described, a bail adapted for connection with a lawn mower, a handle having pivotal connection with the bail at a point spaced from the end thereof, a forked and toothed member having pivotal connection with the end of the bail and extending on opposite sides of the handle, an engaging device carried by the handle for limiting the movement of the toothed member, and a spring connected with the forked and toothed member and with the end of the handle.

3. In a device of the class described, a bail adapted for connection with a lawn mower and comprising a plurality of spaced members, a handle located between said members and having pivotal connection therewith, a forked and toothed member coöperating with the handle, said handle extending between the prongs of the forked member, a slotted plate secured to the handle, the edges of the slot engaging the toothed portion of the forked member, and resilient means connecting the forked member with the handle.

4. In a device of the class described, a plurality of members spaced apart and constituting a bail adapted for connection with a lawn mower, a handle having pivotal connection with said members at a point spaced from the end thereof, a forked member provided with notches on one edge thereof, said forked member having pivotal connection with the end portions of the bail, adjusting means for said pivotal connection last named, and a spring connected with the forked member at a point spaced from its pivotal connection with the members of the bail, said spring being connected with the end of the handle.

In testimony whereof I affix my signature.

CHARLES LEDERER, Sr.

Copies of this patent may be obtained for five cents each, by addressing the "Commissioner of Patents, Washington, D. C."